Dec. 5, 1967     D. M. PRICE     3,355,896
ADJUSTABLE IRRIGATION DAM
Filed Dec. 15, 1965
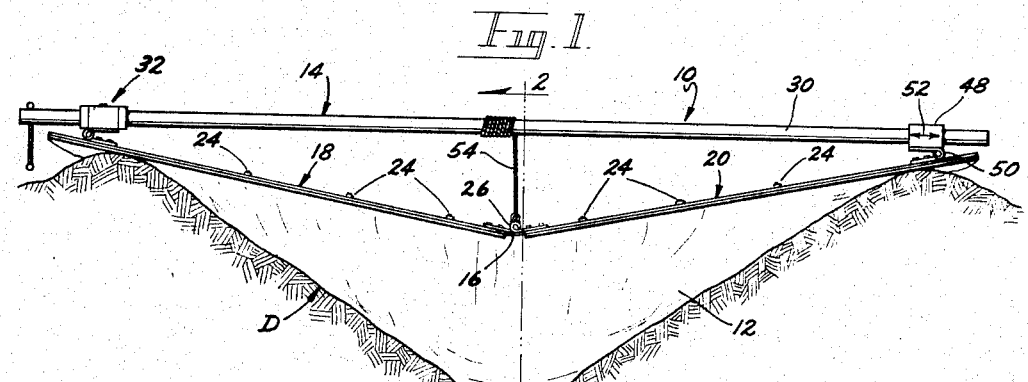
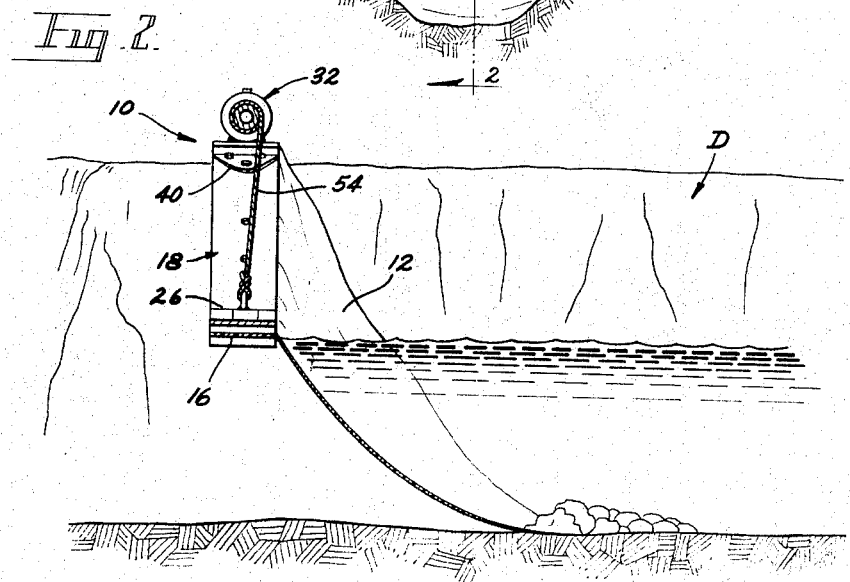
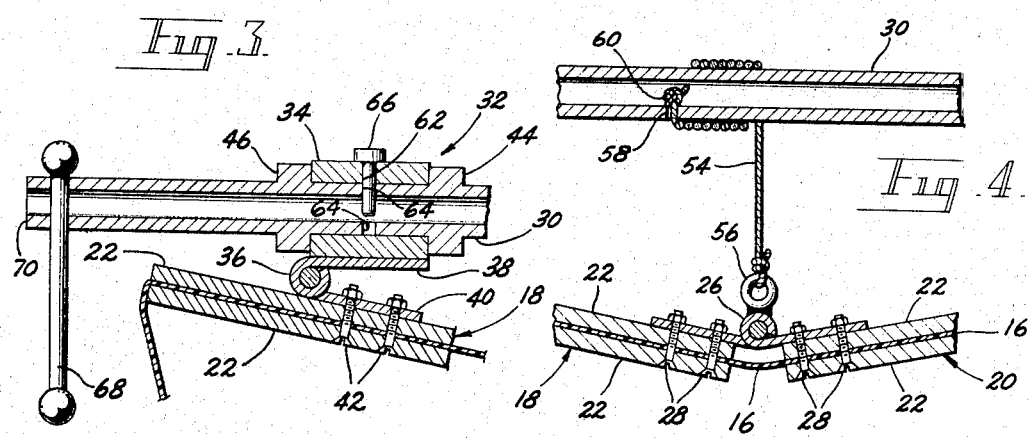
INVENTOR.
DOUGLAS M. PRICE
BY
Meyers & Peterson
ATTORNEYS

United States Patent Office 3,355,896
Patented Dec. 5, 1967

3,355,896
ADJUSTABLE IRRIGATION DAM
Douglas M. Price, Hensler Post Office,
Price, N. Dak. 58547
Filed Dec. 15, 1965, Ser. No. 513,976
8 Claims. (Cl. 61—29)

ABSTRACT OF THE DISCLOSURE

A sheet of flexible material is suspened from a pair of elongated members that are hinged or pivotally connected together at their adjacent ends. Extending upwardly from the connected ends of the elongated members is a flexible cord that is wrapped around a rotatable shaft. Consequently, when the shaft is rotated in one direction, the flexible sheet is lowered and when the shaft is rotated in an opposite direction, the sheet is raised.

---

This invention relates to a portable and adjustable dam for irrigation ditches. More particularly, the invention relates to an irrigation dam of the type employing a flexible sheet adapted to be adjustably supported in transverse blocking relation to an irrigation ditch.

On object of this invention is to provide a portable irrigation dam including improved means for supporting a flexible damming element within a ditch. More specifically, it is an aim of the invention to provide an irrigation dam having sheet supporting means which can be quickly and easily adjusted to vary the height of the upper edge of the flexible sheet so as to conveniently adjust the damming action thereof.

Another object of the invention is to provide an irrigation dam which is simple in construction and light in weight so as to be readily portable, but which provides effective adjustable support for a flexible damming sheet within an irrigation ditch.

Another object of the invention is to provide a flexible sheet type of irrigation dam in which access from only one side of the ditch is required for making a height adjustment of the dam. In this respect, the dam can be quickly adjusted by one person.

The irrigation dam according to the present invention employs novel means for adjustably supporting an edge of a flexible dam sheet at desired positions above the bottom of a ditch. This means comprises a supporting frame including a pair of elongated members which are adapted to have the edge of the flexible sheet attached thereto, and which are pivotally connected to each other in end-to-end relation. The length of the members is such that they may be disposed in spanning relation to the ditch with their free outer ends resting on the ditch banks and with their pivotal connection disposed substantially centrally of the ditch. The supporting frame further includes means connected to the elongated sheet supporting members for suspending the pivotal connection therebetween at the desired elevation. In the preferred embodiment of the invention, this suspending means includes a transverse shaft which extends in substantially parallel relation to the sheet supporting members and is rotatable with respect thereto. A flexible element such as a cable or cord is attached to the pivotal connection between the sheet supporting members at one end thereof and is fixedly attached to the transverse shaft at the other end thereof. Rotation of the shaft will thus wind the cord on the shaft in the manner of a windlass for raising and lowering the sheet supporting means.

Other objects, advantages, and new features of the invention will become apparent from the following detailed description when read in conjunction with the accompanying drawings wherein:

FIGURE 1 is a transverse sectional view through an irrigation ditch, showing the dam of the present invention operatively disposed therewithin;

FIGURE 2 is a side sectional view through the ditch and the dam of the invention taken on the line 2—2 of FIGURE 1;

FIGURE 3 is a detailed sectional view showing the structure of the pivotal and rotatable connecting means at the left side of FIGURE 1; and FIGURE 4 is a detailed sectional view through the central portion of the dam, showing the construction of the pivotal connecting means for the sheet supporting members and illustrating the adjustable suspending means therefor.

Referring now to the drawings in detail, FIGURES 1 and 2 thereof show a preferred embodiment of the invention in operative position within an irrigation ditch D for holding water at the desired height therein. The dam is generally indicated at 10 and consists of a sheet of flexible material 12 and a supporting frame 14 for adjustably supporting the upper edge portion 16 of the sheet 12 at the desired elevation within the ditch D.

Supporting frame 14 includes a pair of elongated members 18 and 20 adapted to support the edge 16 of sheet 12. Each of the elongated members 18 and 20 is made up of a pair of strips or slats 22 which are adapted to be connected together with the edge 16 of sheet 12 held therebetween. Preferably, threaded fasteners such as bolts 24 are used for this purpose so that the parts may be disassembled readily for the replacement of a sheet 12 if it should become damaged or worn.

The elongated members 18 and 20 are pivotally connected together in generally end-to-end relation by means of a hinge 26 attached in any suitable manner such as by bolts 28, as seen in FIGURE 4. The overall size of the dam 10 may be varied to meet particular needs, but for a particular ditch size, the elongated members 18 and 20 should be of such length that their opposite free ends may rest on the ditch bank with the hinge 26 disposed about centrally of the ditch. It will be apparent that the angle between the elongated members 18 and 20 will determine the effective height of the dam.

Supporting frame 14 further includes an elongated cylindrical shaft 30, the axial length of which is greater than the combined lengths of the elongated members 18 and 20. In the illustrated embodiment, elongated member 18 is connected to the shaft 30 by means of a coupling 32 adapted to permit relative pivotal and rotational movement between the shaft 30 and the elongated member 18, but preventing relative longitudinal movement therebetween. As illustrated in FIGURE 3, the coupling 32 includes a sleeve 34 disposed in surrounding relation to the shaft 30. Elongated member 18 is pivotally connected to sleeve 34 by means of a hinge 36, one leaf 38 of which is secured, as by welding, to the sleeve 34 and the other leaf 40 of which is connected to the elongated member 18 by means of bolts 42. Thus, the elongated member 18 may be pivoted about the axis defined by the hinge 36 to change the angle betwen the shaft 30 and the elongated member 18, and the shaft 30 may be rotated within the sleeve 34. The shaft 30 carries a pair of spaced flanges 44 and 46 adjacent the ends of the sleeve 34 for preventing longitudinal movement of the sleeve 34 with respect to the shaft 30.

Elongated member 20 is similiarly connected to shaft 30, as seen at the right side of FIGURE 1, by means of a sleeve 48 and a hinge 50. Here, however, the shaft 30 is not provided with flanges so that the sleeve 48 may slide axially on the shaft 30 as suggested by the arrows 52 on the sleeve 48. This sliding movement of the sleeve 48 is necessary to permit the desired angular adjustment of the elongated members 18 and 20 in this embodiment of the invention. It has been stated that the length of the shaft 30 is greater that the combined lengths of the members 18 and 20 and this is simply to insure that sleeve 48 will not pass off the end of the shaft 30 when the elements 18 and 20 are raised to the full extent to lie parallel to the shaft 30.

The elongated members 18 and 20 are held in their adjusted relationship by means of a flexible cable or cord 54 which extends vertically between the hinge 26 and the shaft 30. One end of the cord 54 is connected to the hinge 26 by tying it to a ring 56 welded or otherwise attached to the body of hinge 26. The opposite end of the cord 54 is fixedly attached to the shaft 30. With a tubular shaft as shown, a convenient method of attaching the cord 54 to the shaft 30 is by providing an aperture as shown at 58 in the wall of the shaft 30. The cord 54 may then be inserted through the aperture 58 and retained thereby means of a stop knot such as the knot 60. With the cord 54 attached in this manner, rotation of the shaft 30 will serve to wind or unwind the cord 54 in the manner of a windlass to vary the height at which the elongated members 18 and 20 are held.

The adjusted position of the elongated members 18 and 20 is maintained by selectively preventing rotation of the shaft 30 with respect to the elongated members 18 and 20. For this purpose, the sleeve 34 is provided with an aperture 62 and the shaft 30 has several apertures 64 which can be brought into aligned relation to the aperture 62 in sleeve 34. A pin 66 may then be inserted in the aligned apertures 62 and 64 to prevent further relative rotation of the sleeve 34 and the shaft 30.

A handle 68 is carried near the end 70 of the shaft 30 to facilitate rotation of the shaft 30 to adjust the dam. Handle 68 is placed adjacent coupling 32 so that access to pin 66 and handle 68 may be had from one side of the ditch.

The use and operation of the invention should now be clear. Upon initially placing the dam in the ditch, the desired length of cord 54 is paid off to establish the desired damming height, the adjusted arrangement of the parts being maintained by means of the pin 66 as noted above. Subsequent adjustments of the height of the dam can be easily effected simply by removing the pin 66 to permit relative rotation of shaft 30 and then winding or unwinding the cord 54 to raise or lower the elongated members 18 and 20. After the desired adjustment has been accomplished, the nearest aperture 64 in shaft 30 is aligned with the aperture 62 in sleeve 34 and the pin 66 is reinserted to hold the parts in their adjusted condition. All of these operations may be easily performed from one side of the ditch.

When it is desired to transport or store the dam, cord 54 can be wound up to bring the elongated members 18 and 20 into parallel relation to shaft 30. Flexible sheet 12 can then be wrapped around the shaft 30 and elongated members 18 and 20. The dam is relatively light in weight and can be easily transported in the rolled up condition to the next place of use or it can be stored in a minimum of space.

It is to be understood that the invention is not limited to the particular structure described, above, but within the scope of the appended claims may be pracaiced in other ways.

I claim:

1. An adjustable irrigation dam comprising a sheet of flexible material adapted to be disposed in transverse blocking relation to an irrigation ditch, a pair of elongated members adapted to have an edge of said sheet attached thereto, means pivotally connecting said elongated members together in end-to-end relation, the length of said elongated members being such that the respective free ends thereof may rest on the banks of said ditch with said connecting means disposed centrally of said ditch, a transverse shaft disposed above said elongated members, means movably connecting said shaft on said elongated members, and a flexible member attached at one of its ends to said elongated members and at the other of its ends to said shaft, whereby rotation of said shaft will wind or unwind said flexible member on said shaft to adjust the position of said elongated members.

2. An adjustable irrigation dam as defined in claim 1, wherein said shaft connecting means comprises means near the free end of one of said elongated members for connecting that elongated member to said shaft at a fixed longitudinal position thereon for both pivotal and rotational relative movement therebetween, and means near the free end of the other of said elongated members for connecting that elongated member to said shaft for relative pivotal, rotational and longitudinal sliding movement with respect thereto.

3. An adjustable irrigation dam as defined in claim 2, further comprising means for selectively preventing rotation of said shaft with respect to said elongated members.

4. An adjustable irrigation dam as defined in claim 2, wherein said shaft is cylindrical, said connecting means for said one elongated member comprising a sleeve surrounding said shaft and rotatable thereon, a hinge pivotally connecting said sleeve to said elongated member, and a pair of flanges on said shaft adjacent the ends of said sleeve for holding said sleeve at said fixed longitudinal position.

5. An adjustable irrigation dam as defined in claim 4 wherein said connecting means for said other elongated member comprises a second sleeve rotatably surrounding said shaft, and a hinge pivotally connecting said second sleeve to said other elongated member.

6. An adjustable irrigation dam as defined in claim 4, further comprising means for selectively preventing rotation of said shaft with respect to said elongated members.

7. An adjustable irrigation dam as defined in claim 6, wherein said rotation preventing means comprises means defining an aperture in said sleeve, means defining an aperture in said shaft alignable with the aperture in said sleeve, and a pin insertable in said apertures when they are aligned.

8. An adjustable irrigation dam as defined in claim 7, further comprising handle means at the end of said shaft nearer to said rotation preventing means for facilitating rotation of said shaft.

References Cited

UNITED STATES PATENTS

| | | | |
|---|---|---|---|
| 183,411 | 10/1876 | Miller et al. | 160—238 |
| 1,784,955 | 12/1930 | Ballard | 61—29 |
| 2,654,225 | 10/1953 | Saunders et al. | 61—29 |
| 2,698,518 | 1/1955 | Hofferber | 61—29 |
| 3,084,516 | 4/1963 | Coffman | 61—29 |

REINALDO P. MACHADO, *Primary Examiner.*